(12) United States Patent
Liu

(10) Patent No.: US 7,967,597 B2
(45) Date of Patent: Jun. 28, 2011

(54) MOLD RELEASING DEVICE AND MOLD RELEASING METHOD

(75) Inventor: Hsin-Chuan Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 284 days.

(21) Appl. No.: 12/198,302

(22) Filed: Aug. 26, 2008

(65) Prior Publication Data

US 2009/0266971 A1  Oct. 29, 2009

(30) Foreign Application Priority Data

Apr. 28, 2008 (CN) .......................... 2008 1 0301321

(51) Int. Cl.
*B29D 11/00* (2006.01)
(52) U.S. Cl. .................... 425/414; 425/192 R; 425/443; 425/436 RM; 425/468; 425/808; 249/63
(58) Field of Classification Search .................. 425/191, 425/193, 414, 418, 466–468, 808, DIG. 10, 425/192 R, 195, 411, 402, 436 R, 441, 443, 425/436 RM; 249/63, 177, 181, 182
See application file for complete search history.

(56) References Cited

U.S. PATENT DOCUMENTS

| | | | | |
|---|---|---|---|---|
| 1,626,051 A | * | 4/1927 | Rode ......................... | 100/258 R |
| 2,007,567 A | * | 7/1935 | Fischer ........................ | 425/84 |
| 2,066,936 A | * | 1/1937 | Jahraus ........................ | 100/316 |
| 2,233,057 A | * | 2/1941 | Luce ............................. | 65/305 |
| 2,266,169 A | * | 12/1941 | Crumrine ...................... | 249/95 |
| 2,300,210 A | * | 10/1942 | Dittmer ........................ | 249/161 |
| 2,459,205 A | * | 1/1949 | Wells et al. .................... | 425/412 |
| 2,516,373 A | * | 7/1950 | Ehlert et al. ................... | 425/394 |
| 2,769,200 A | * | 11/1956 | Longstreth et al. ............ | 425/466 |
| 3,183,551 A | * | 5/1965 | Johnson ......................... | 425/437 |
| 3,198,861 A | * | 8/1965 | Marvel .......................... | 264/534 |
| 3,273,204 A | * | 9/1966 | Craddock ...................... | 425/394 |
| 3,302,664 A | * | 2/1967 | Plamann ......................... | 138/89 |
| 3,427,687 A | * | 2/1969 | Miller ........................... | 425/195 |
| 3,475,790 A | * | 11/1969 | Bush et al. ..................... | 425/511 |
| 3,856,450 A | * | 12/1974 | Britten .......................... | 425/398 |
| 3,902,693 A | * | 9/1975 | Crandon et al. ............... | 249/134 |
| 4,552,522 A | * | 11/1985 | Van Melle ..................... | 425/182 |
| 4,919,602 A | * | 4/1990 | Janszen .......................... | 425/12 |
| 5,116,450 A | * | 5/1992 | Spoo et al. ..................... | 156/441 |
| 5,326,244 A | * | 7/1994 | Ridgill et al. ................. | 425/127 |
| 5,449,284 A | * | 9/1995 | Spina ............................. | 425/525 |
| 6,145,213 A | * | 11/2000 | Shimano et al. ................ | 33/702 |
| 6,280,566 B1 | * | 8/2001 | Naito et al. ................. | 156/580.1 |
| 6,494,705 B1 | * | 12/2002 | Wallin ...................... | 425/348 R |
| 2006/0246170 A1 | * | 11/2006 | Visona' ......................... | 425/418 |
| 2007/0114699 A1 | | 5/2007 | Chang | |
| 2007/0190204 A1 | | 8/2007 | Chiang | |

FOREIGN PATENT DOCUMENTS

JP    62202713 A  *  9/1987
JP    62222814 A  *  9/1987

* cited by examiner

*Primary Examiner* — Joseph S Del Sole
*Assistant Examiner* — Dimple Bodawala
(74) *Attorney, Agent, or Firm* — Andrew C. Cheng

(57) ABSTRACT

A mold releasing method for releasing a core member from a mold includes steps of: a) providing a supporting member and arranging the supporting member on the mold, the supporting member comprising a base and a number of sidewalls extending from the base to the mold, a through hole being defined in the substrate and co-axially aligned with the core member; b) providing a bolt, the bolt comprising a threaded rod extending through the through hole of the substrate and threadedly engaged with the core member; and c) rotating the bolt to move the core member to disengage from the mold.

6 Claims, 3 Drawing Sheets

MOLD RELEASING DEVICE AND MOLD RELEASING METHOD

BACKGROUND

1. Field of the Invention

The present invention generally relates to a mold releasing device, and particularly to a mold releasing method.

2. Description of Related Art

Injection molding processes are widely used for manufacturing workpieces, for example, optical articles such as lenses, light guide plates or other. The injection molding method has advantages such as high production rate and efficiency, and cost of optical elements thereby can be reduced.

In an injection molding process of the related art, a mold is utilized for forming the workpiece. The mold typically includes a first mold part and a second mold part. Each of the first and second mold parts has a core member. Both of the core members have a molding surface conforming to a surface of the workpiece. When the first and second mold parts are brought together, a mold chamber according to a size of the workpiece is defined between the two molding surfaces of the core members. Generally, when the size, such as a thickness of the workpiece requires an adjustment, the core members of the mold need to be pulled apart from the mold to be replaced, or to be disassembled and then modified. However, pulling apart the core members directly may lead to problems for the mold such as abrasion and loss of concentricity, as a result, a service life of the mold is shortened and quality of the workpiece formed using such a mold is reduced also.

Therefore, a mold releasing method is desired for overcoming the described limitations.

SUMMARY

In accordance with the present embodiment, a mold releasing method for releasing a core member from a mold includes steps of: a) providing a supporting member and arranging the supporting member on the mold, the supporting member comprising a base and a number of sidewalls extending from the base to the mold, a through hole being defined in the substrate and co-axially aligned with the core member; b) providing a bolt, the bolt comprising a threaded rod extending through the through hole of the substrate and threadedly engaged with the core member; and c) rotating the bolt to move the core member to disengage from the mold.

Other advantages and novel features of the present invention will be drawn from the following detailed description of a preferred embodiment of the present invention with attached drawings.

DETAILED DESCRIPTION OF THE INVENTION

A detailed explanation of a mold releasing device according to an exemplary embodiment will now be made with reference to the drawings attached hereto. The mold releasing device is configured for releasing a core member of a mold.

Figure 1:
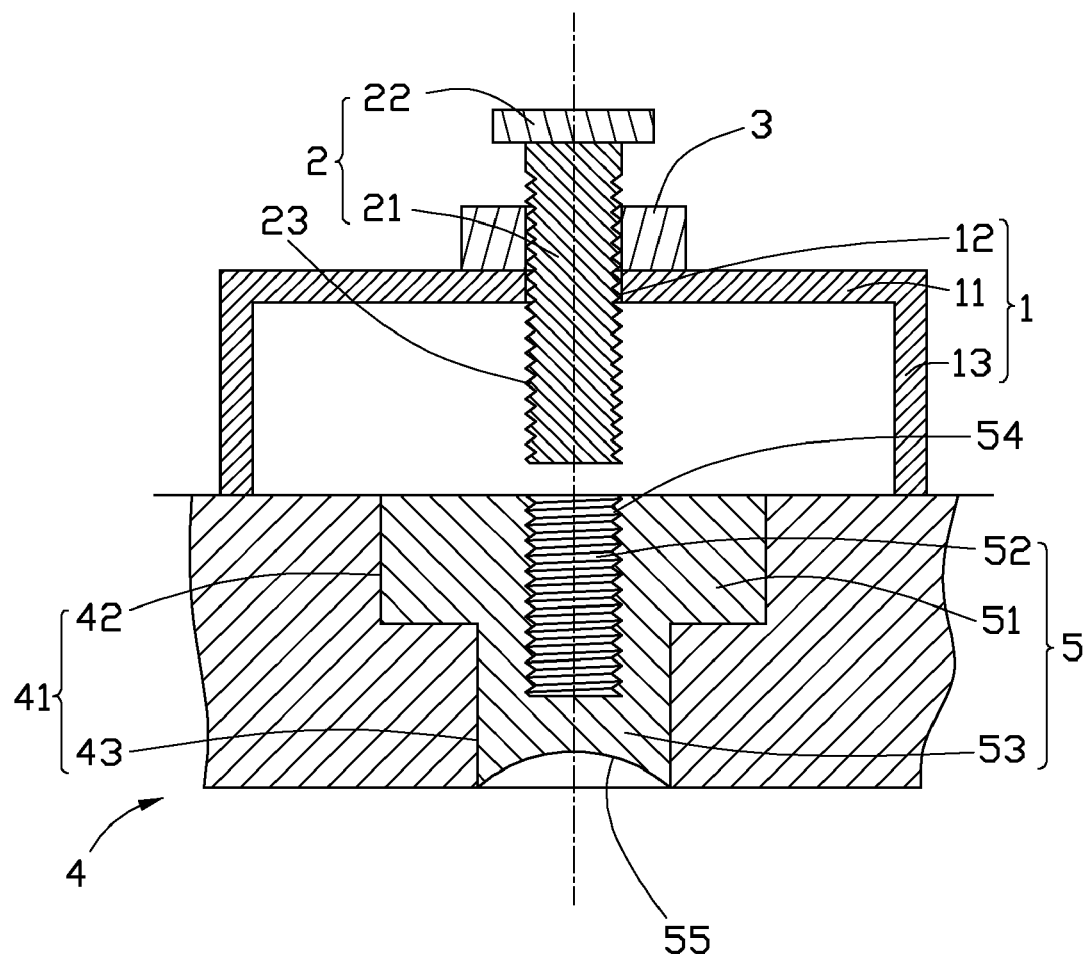
FIG. 1 is a schematic view of a mold releasing device arranged on a mold.

As shown in FIG. 1, the mold includes a mold base 4 and a core member 5. The mold base 4 defines a mounting hole 41 therein. The mounting hole 41 extends through the mold base 4, and includes an upper portion 42 and a lower portion 43. The upper portion 42 of the mounting hole 41 has a diameter greater than that of the lower portion 43, i.e., the mold base 4 has a relatively large inner diameter at an upper portion, and a relatively small inner diameter at a lower portion thereof. Thus a step (not labeled) is formed at an inner surface of the mold base 4. The core member 5, which can be a member such as an insert, is received in the mounting hole 41 of the mold base 4. The core member 5 includes an upper portion 51 arranged on the step of the mold base 4 with a diameter being approximately the same as the diameter of the upper portion 42 of the mounting hole 41, and a lower portion 53 with a diameter being approximately the same as the diameter of the lower portion 43 of the mounting hole 41. The lower portion 53 of the core member 5 forms a molding surface 55 at a distal end thereof. A tapped blind hole 52 is defined in a center of the upper portion 51 of the core member 5 with inner thread 54 formed therein. The tapped blind hole 52 is co-axially aligned with the mounting hole 41 of the mold base 4. A depth of the tapped blind hole 52 of the core member 5 is less than a height of the core member 5, and is greater than a height of the lower portion 53 of the core member 5.

The mold releasing device includes a supporting member 1, a bolt 2 and a washer 3. The supporting member 1 includes a substrate 11 and a pair of sidewalls 13. The substrate 11 is elongated and rectangular. A through hole 12 is defined in a center of the substrate 1. The sidewalls 13 extend downwardly from two opposite sides of the substrate 11, respectively. A distance between the sidewalls 13 of the supporting member 1 is greater than the diameter of the upper portion 51 of the core member 5, and the supporting member 1 is arranged on a top surface (not labeled) of the mold base 4 with the sidewalls 13 thereof located at two opposite sides of the core member 5 of the mold. A height of the sidewalls 13 is greater than the height of the lower portion 53 of the core member 5. The through hole 12 is co-axially aligned with the tapped blind hole 52 of the core member 5.

The bolt 2 includes a threaded rod 21 with outer thread 23 formed on an outer surface thereof, and a head 22 formed on a top end of the threaded rod 21. The head 22 has a diameter lager than that of the threaded rod 21. The washer 3 is ring-shaped with a central hole (not labeled) defined therein. The washer 3 is arranged on the substrate 11 of the supporting member 1 and surrounds the threaded rod 21 of the bolt 2. An inner diameter of the washer 3 is greater than a diameter of the threaded rod 21 of the bolt 2 and less than a diameter of the head 22 of the bolt 2. An outer diameter of the washer 3 is greater than the diameter of the head 22 of the bolt 2. The threaded rod 21 has a height greater than a sum of a height of the washer 3 and the height of sidewalls 13 of the supporting member 1, and less than a sum of a depth of the tapped blind hole 52, the height of the sidewalls 13 and the height of the washer 3. A height of the outer thread 23 of the threaded rod 21 of the bolt 2 is not less than the depth of the tapped blind hole 52 of the core member 5. In this embodiment, the height of the outer thread 23 is greater than the depth of the tapped blind hole 52.

Figure 2:
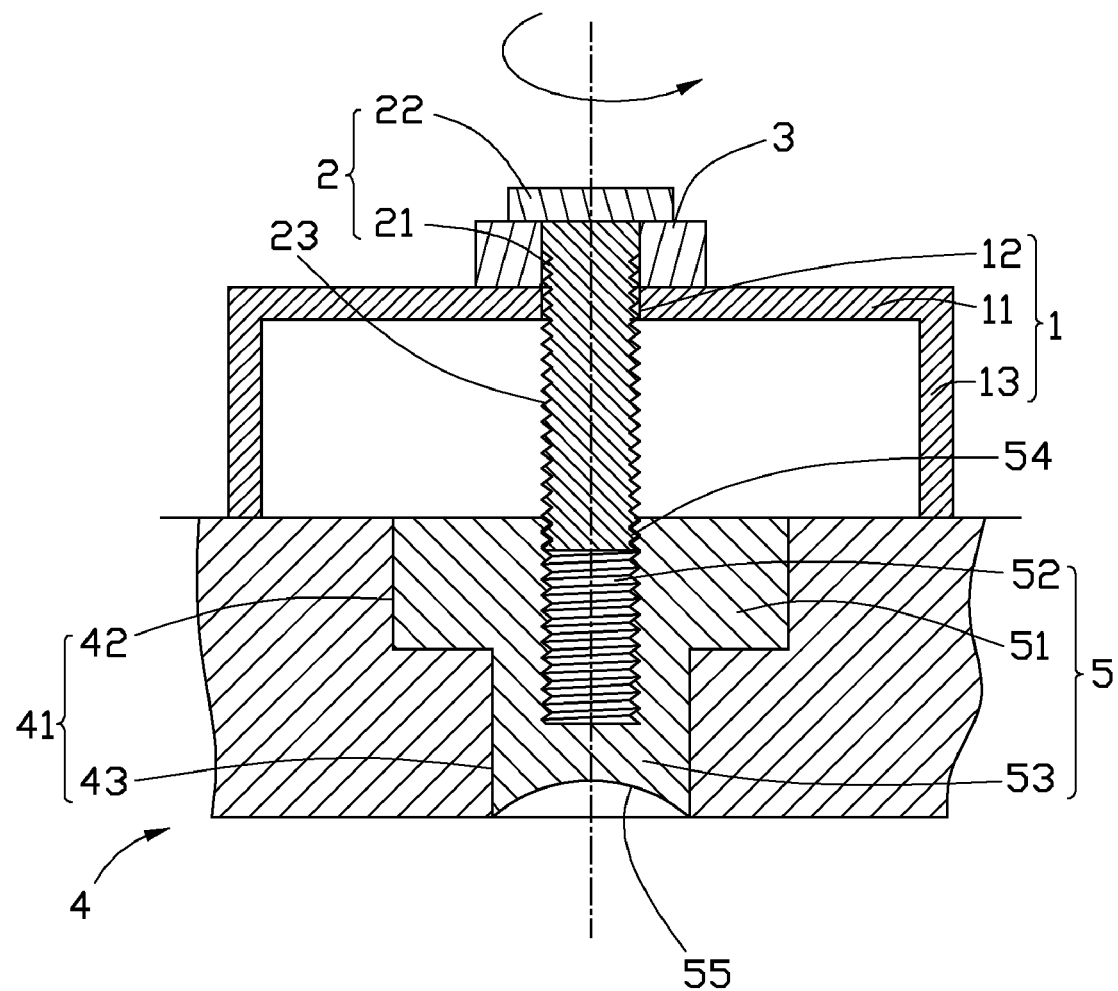
FIG. 2 shows the mold releasing device engaging with the mold core of the mold.

Referring to FIG. 2, when the core member 5 of the mold needs to be replaced, the mold releasing device is mounted on the mold for releasing the core member 5 of the mold. The threaded rod 21 of the bolt 2 extends through the washer 3 and the through hole 12 of the substrate 11 of the supporting member 1 to the core member 5. Since the height of the bolt 2 is greater than the sum of the supporting member 1 and the washer 3, the bottom end of the bolt 2 extends into the tapped blind hole 54 of the core member 5. The threaded rod 21 of the bolt 2 and the core member 5 cooperatively form a helical pair. Then rotates the head 22 of the bolts 2, the threaded rod 21 of the bolt 2 rotates and moves downwardly along an axial direction thereof and threadedly engages into the tapped blind hole 52 of the core member 5. When the head 22 of the bolt 2 contacts to the washer 3, the bolt 2 cannot move downwardly. A bottom end of the threaded rod 21 of the bolt 22 is received in a top end of the tapped blind hole 54 of the core member 5. A distance between the bottom end of the threaded rod 21 and a bottom end of the tapped blind hole 54 is a little greater than the height of the lower portion 53 of the core member 5.

Figure 3:
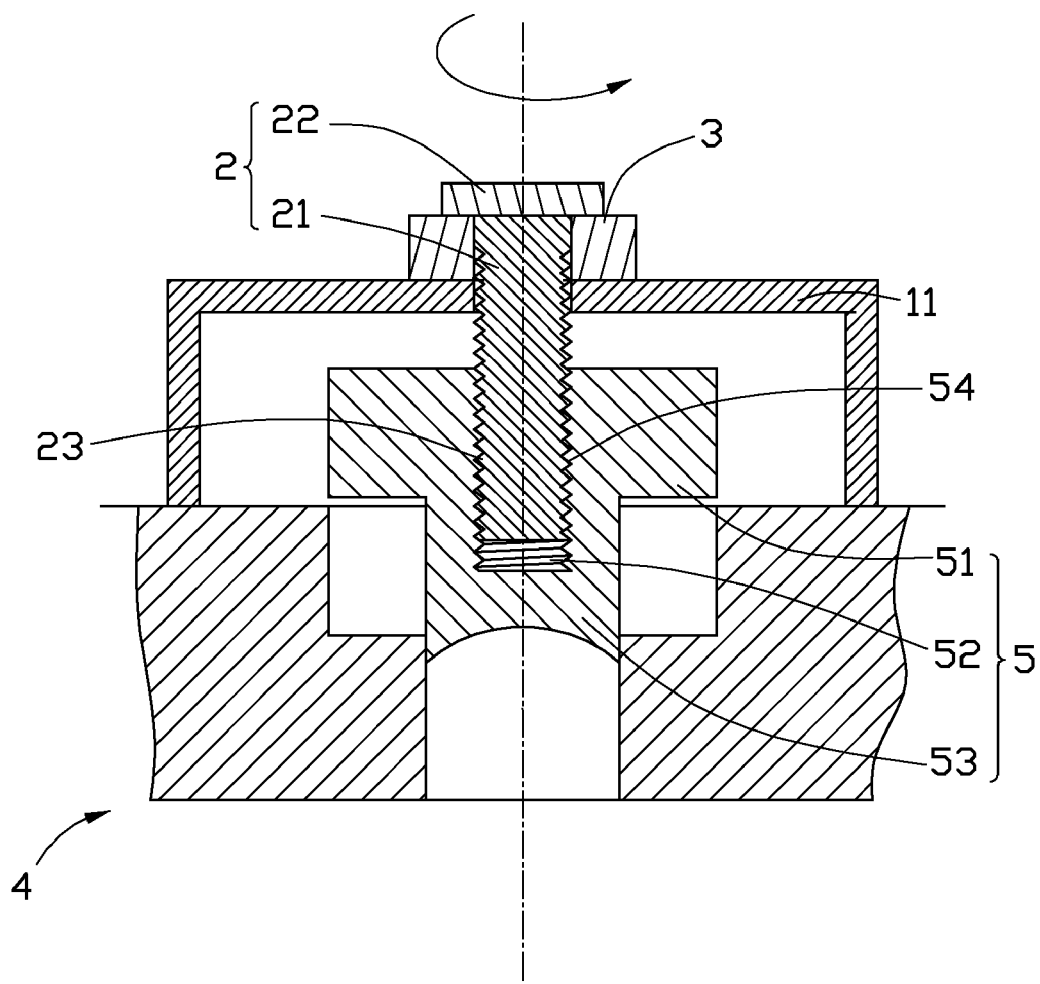
FIG. 3 shows the mold releasing device releasing a mold core of the mold.

Referring to FIG. 3, then rotates the bolt 2 continually, the rotation of the bolt 2 turns to an axial movement of the core member through the action between the outer thread 23 of the threaded rod 21 and the inner thread 54 of the tapped blind hole 52. For the distance between the threaded rod 21 and the tapped blind hole 54 is a little greater than the height of the lower portion 53, the lower portion of the core member 5 can move upwardly and axially to a position a little higher than the step of the mold base 4. For the height of the sidewalls 13 of the supporting member 1 is higher than that of the lower portion 53 of the core member 5, when the lower portion 53 of the core member is a little higher than the step of the mold base 4, the upper portion 51 of the core member is lower than the substrate 11 of the supporting member 1. The core member 5 thus is conveniently and accurately released from the mold base 4 as the rotation of the bolt 2. The washer 3 arranged between the supporting member 1 and the bolt 2 prevents friction occurring between the head 22 and the substrate 11 during rotation of the bolt 2. Alternatively, the washer 3 can be omitted, and the head 22 of the bolt 2 abuts against the substrate 11 of the supporting member 1. In this situation, rotation of the bolt 2 can be turned to the axial movement of the core member 5 through the action of the outer thread 23 of the bolt 2 and the inner thread 54 of the core member 5.

As stated above, the mold releasing device and the mold releasing method employ a bolt 2 threadedly engaging into the core member 5 to form a helical pair, therefore, during mold releasing processes, the core member 5 moves axially and outwardly during rotation of the bolt 2. The movement of the core member 5 is accurate and thus problems such as abrasion generated by pulling the core member 5 can be avoided. A service life of the mold is elongated and a quality of the workpiece formed using such a mold is improved. Alternatively, the supporting member 1 can define a thread in the through hole 12 thereof, and the bolt 2 can be threadedly engaged with the thread of the supporting member 1 and preassembled to the supporting member 1. As a result, transportation or mounting of the mold releasing device is convenient.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A combination, comprising:
    a mold base defining a mounting hole therein, the mounting hole extending through the mold base, and the mounting hole including an upper portion and a lower portion in sequence along the extending direction thereof, a diameter of the upper portion being greater than that of the lower portion, a step being formed at an inner surface of the mold base;
    a mold core mounted in the mold base, the mold core being not rotatable relative to the mold base, the mold core defining a threaded hole therein, and the mold core including an upper portion arranged on the step of the mold base with a diameter thereof being substantially the same as that of the upper portion of the mounting hole, and a lower portion with a diameter thereof being substantially the same as that of the lower portion of the mounting hole;
    a supporting member mounted on the mold base, the supporting member including a base and a plurality of sidewalls extending from the base to the mold base, a height of the sidewalls being greater than that of the lower portion of the mold core, the base of the supporting member defining a through hole in alignment with the threaded hole of the mold core; and
    a bolt having a threaded rod and a head formed at one end of the rod, the head being arranged at an opposite side of the supporting member to the mold core, the threaded rod extending through the through hole and threadedly engaged in the threaded hole of the mold core, the bolt being configured for moving the mold core to disengage from the mold base by rotation of the threaded rod in the threaded hole of the mold core.

2. The mold releasing device of claim 1, further comprising a washer arranged between the head of the bolt and the supporting member to reduce friction between the head and the supporting member.

3. The mold releasing device of claim 2, wherein an inner diameter of the washer is greater than a diameter of the threaded rod of the bolt and less than a diameter of the head of the bolt, and an outer diameter of the washer is greater than the diameter of the head of the bolt.

4. The mold releasing device of claim 1, wherein a length of the rod of the bolt is greater than a height of the supporting member relative the mold core, and is less than a sum of a depth of the threaded hole of the mold core and the height of the supporting member.

5. The mold releasing device of claim 1, wherein the through hole in the base of the supporting member defines a thread therein the through hole, and the threaded rod of the bolt is threadedly engaged into the through hole of the base.

6. The mold releasing device of claim 1, wherein the base is rectangular, and the sidewalls extend from two opposite sides of the base.

* * * * *